Aug. 17, 1926.

M. SCHIESARI 1,596,458

METHOD OF OBTAINING DATA FOR REPRODUCING THREE-DIMENSIONAL OBJECTS

Filed March 13, 1924    2 Sheets-Sheet 1

INVENTOR

Mario Schiesari

Aug. 17, 1926.

M. SCHIESARI 1,596,458

METHOD OF OBTAINING DATA FOR REPRODUCING THREE-DIMENSIONAL OBJECTS

Filed March 13, 1924    2 Sheets-Sheet 2

INVENTOR

Mario Schiesari

Patented Aug. 17, 1926.

1,596,458

UNITED STATES PATENT OFFICE.

MARIO SCHIESARI, OF NEW YORK, N. Y.

METHOD OF OBTAINING DATA FOR REPRODUCING THREE-DIMENSIONAL OBJECTS.

Application filed March 13, 1924. Serial No. 698,899.

This invention relates to a method of obtaining data to be used in reproducing three-dimensional objects, and more particularly refers to improvements over the methods heretofore described by me in two co-pending applications, entitled Method of and apparatus for making sculptures, filed February 5, 1924, Serial No. 690,776, and Method of and apparatus for sculpturing, filed February 26, 1924, Serial No. 695,227.

In the application first mentioned, I disclose a new method of reproducing three dimensional objects, which is based on the employment of profiles of the object to be reproduced, controlling the operation of the carving tool or tools. The profiles thus employed were obtained by moving a tracking stylus over the surface of the object to be reproduced, at equally distanced intervals; the totality of the profiles thus obtained forming, collectively, the diagram of the object.

In the other application, I describe another method of accomplishing the same object, which is based on the setting of the carving tool or tools used, for a given depth of penetration for each point of the surface to be produced, the positional and depth data for said tools being obtained from a diagram in tabulated form, in which all points of the surface are referred to a common plane, and in which each point is identified by its ordinate and abscissa on said plane, and by its distance therefrom.

The tabulated diagrams were obtained by means of a stylus vertically and horizontally adjustable on a plane set in front of the article to be reproduced, successively set at equidistant points in horizontal and vertical rows on said plane, representing positions corresponding to a screen-like subdivision of said plane; said stylus being adjusted axially at each point, to furnish the indication of distance of said point from the plane of reference.

In both applications I have also described alternative methods of obtaining the said data, to be subsequently used for the guiding or setting of the tools employed in making the reproduction; but in both cases, while the object of producing a graphic record of a three-dimensional object giving sufficient information for the reproduction of said object at any time and place, without the original being actually available, was satisfactorily attained, yet the methods described for obtaining said records entailed a considerable amount of work and care, and the employment of considerable time. Furthermore they require the employment of special apparatus, and also represent a good deal of inconvenience for the model, if this is a living subject.

In fact, the requirements of the said methods may make them totally unsuitable for the reproduction of delicate work, or of living subjects, on account of the lack of accuracy which may follow; and in some cases, also, where physical contact with the object to be reproduced may not be had, for instance, in connection with museum exhibits, where no handling or displacing of works of art is allowed.

The main object of the present invention, is to provide a novel and improved method whereby an accurate graphic record of a sculpture or of a living subject may be obtained without the necessity of any physical contact with the original, said method absolutely eliminating the use of a tracking tool.

Another object of this invention, is to provide apparatus suitable for use in connection with projecting means, whereby depth indications for tabulated diagrams, or graphic profiles, may be conveniently obtained, after the preliminary steps in my method have been carried out.

Other objects and advantages of this invention will more clearly appear as the description proceeds, and will be set forth in the appended claims.

My invention is based on, and represents an improvement over a method of reproducing objects described in a patent granted to J. H. Smith June 16, 1908, Serial No. 891,013, and also described in a simplified form in the February, 1924, issue of the Scientific American.

According to said method, the object to be reproduced is placed on a stand or chair so as to be exposed to the action of two or more camera projectors arranged at different angles to the object, and having their optical axes coinciding upon the object. Assuming that only two camera projectors are used, such as is the case where the stand is rotatable and adjustable at different horizontal angular positions, one projector is used simply as a projecting lantern, in which a screen is placed, consisting of a system of markings on clear glass, and projected upon the subject as a lantern slide. The other camera-projector is used as a camera, taking pictures of the subject while under screen illumination.

The photographic plates thus obtained, in conjunction with the screen, constitute a record of the form of the subject. In the production of statuary, the record photographs, usually in the form of the original glass negatives, are used one at a time, by projecting them from the same position as they formerly occupied in the camera-projector, when the photographs were made, while a screen similar to the one originally used is also projected by the other camera-projector. For each marking (letter, line, etc.) found on the photograph, a corresponding marking will be found on the screen, because all markings on the photograph were produced by the projected light passing through the screen to the subject and there being reflected back into the camera to the photographic plate. Therefore, it may be readily understood that if both photograph and screen are projected simultaneously, the light beams from corresponding markings will cross in space at points where these beams were reflected from the subject to the camera when the photographs were made.

Therefore, if material such as clay, be built on the modeling stand, at the point where these corresponding light beams cross in such a way as to cause the image of one marking to fall directly upon that of the other, the surface thus receiving the light will occupy the same position as the corresponding surface of the model or subject, when the photographs were taken.

Thus it may be seen that by building or carving the material until the corresponding markings of screen and record photograph coincide over the whole surface a, true reproduction of the form of the subject will be the result.

The size of statue is regulated by varying the distance from center stand to camera-projectors, after the record photographs have been obtained.

The present invention is based on the application of a similar principle to mechanical processes of reproduction, where, as stated, a graphic record is needed for the guiding or setting of the carving tool used.

Referring to the drawings.

Figure 1:
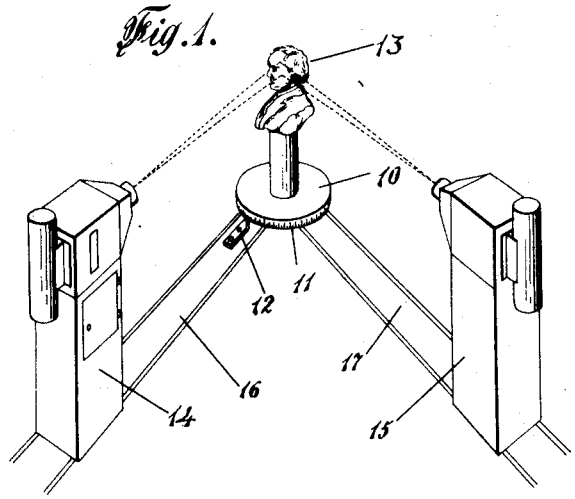
Fig. 1 is a perspective view showing the optical system used in carrying out the invention.
Figure 2:
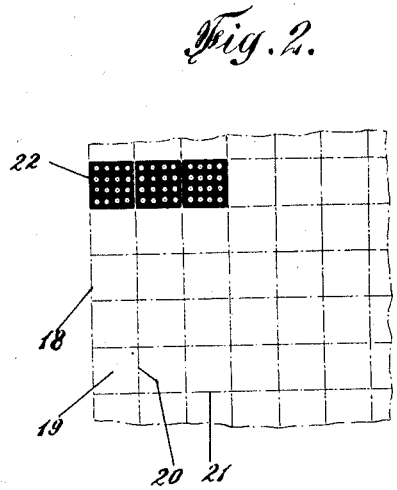
Fig. 2 is a fragmentary plan view of one of the screens used.

The preliminary step of my method is similar to that described in the patent above-mentioned, and is illustrated in Fig. 1. In the same, 10 designates a stand, rotatable around its vertical axis, and adjustable at any angular position by means of a graduation 11 and a pointer 12. The model to be reproduced, 13, is placed on the stand, and two camera-projectors, 14, 15, are arranged at an angle to the model, on radially extending guide-ways or tracks 16, 17, so as to be movable towards and away from the stand.

Figure 3:
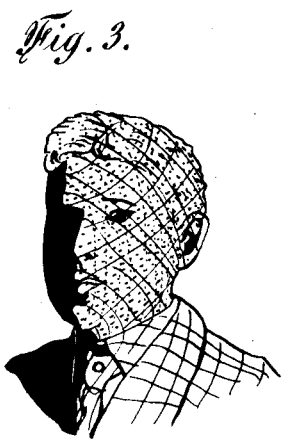
Figs. 3 and 4 are views illustrating the manner in which the screen marks are projected upon the object to be photographed and reproduced.
Figure 4:
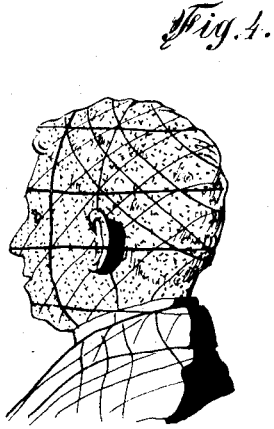

A screen 18, the surface of which is divided in a number of subdivisions or squares 19 by equidistant vertical lines 20 and horizontal lines 21, and which is then painted black, leaving a plurality of equidistant points 22 exposed in each square, is placed in one of the camera-projectors, which is used simply as a projecting lantern. Extraneous light is then shut out, and the luminous points of the screen are projected by means of a strong light upon the object to the photographed. The general effect of such projection is shown in Figs. 3 and 4, some of the luminous points being omitted.

The other camera-projector is used as a camera, and the model, with the projected impression of the screen thereon, is photographed. After this is done, the screen is removed from the lantern, and the object or model is, if desired, photographed in the same position, this photograph being of assistance in finishing and retouching the work of the reproducing carving tool.

Both camera-projectors are preferably set at the same distance from the stand, although with suitable modifications in the carrying out of the other steps, the method may also be applied if the distance of one camera-projector does not correspond to the distance of the other.

It is now obvious, that if the two camera-projectors are placed at the same relative angle and position, the screen being placed in one used as a projecting lantern, and the photographic plate being placed in the other, similarly used, and the light is shut out from all luminous points of the screen but one, the same being done in connection with the markings on the plate, but the one corresponding to the luminous point exposed, the two beams of light thus produced will meet at a point in space corresponding to the point of the surface of the model on which the original corresponding luminous point of the screen was projected.

This being so, if a plane surface is moved along a line centrally dividing the angle between the two camera-projectors, said surface being normal to said line, it will be understood that the two beams will be projected as two luminous points on said surface, and will meet on the same when its position corresponds to the one of the original projected point.

Figure 5:
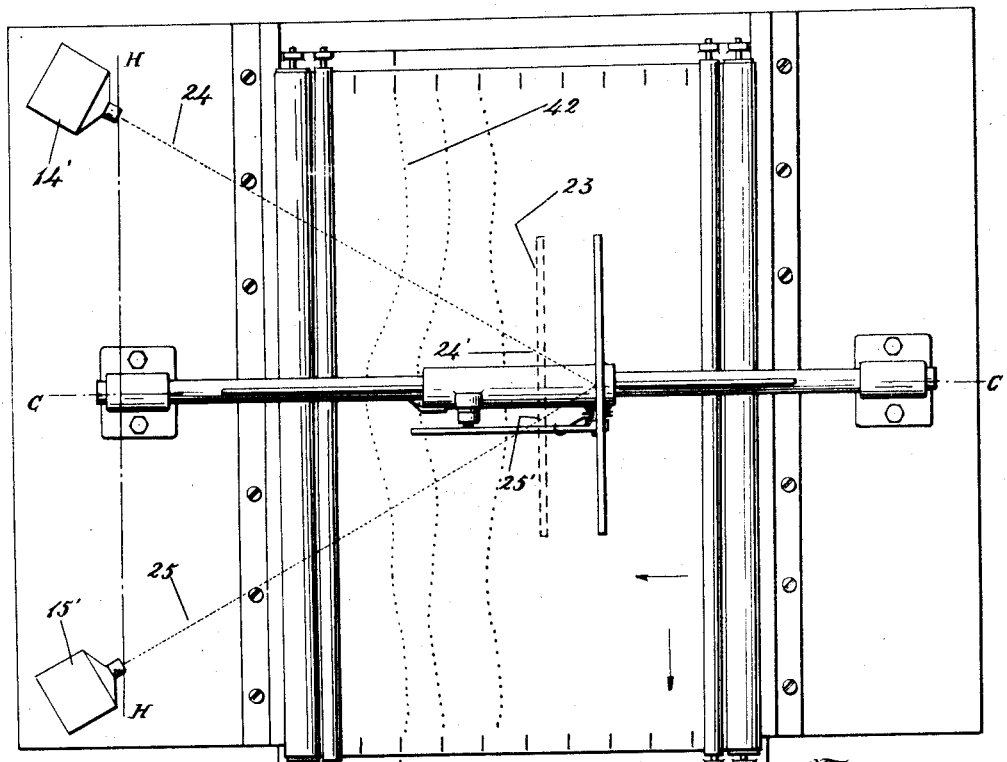
Fig. 5 is a plan view of an apparatus which may be used for obtaining the data of penetration of the carving tools to be used in making a reproduction.

Referring now to Fig. 5, if 14′, 15′, are the two camera-projectors, thus used, and 23 is the plane surface normal to the line bi-secting the angle between the axes of the two camera-projectors, if said surface is permanently placed in the position shown in dotted lines, the two beams 24, 25, issuing from the camera-projectors will appear on said surface as two luminous points 24′, 25′; but the distance of the point at which the two beams will meet, from an assumed plane of reference H—H, may easily be determined by some simple calculation. If, on the other hand, in order to avoid the necessity of calculations the surface is made movable along the central line C—C, the same may be set at the distance where the two beams meet, and the distance of the corresponding point may be directly obtained.

Figure 6:
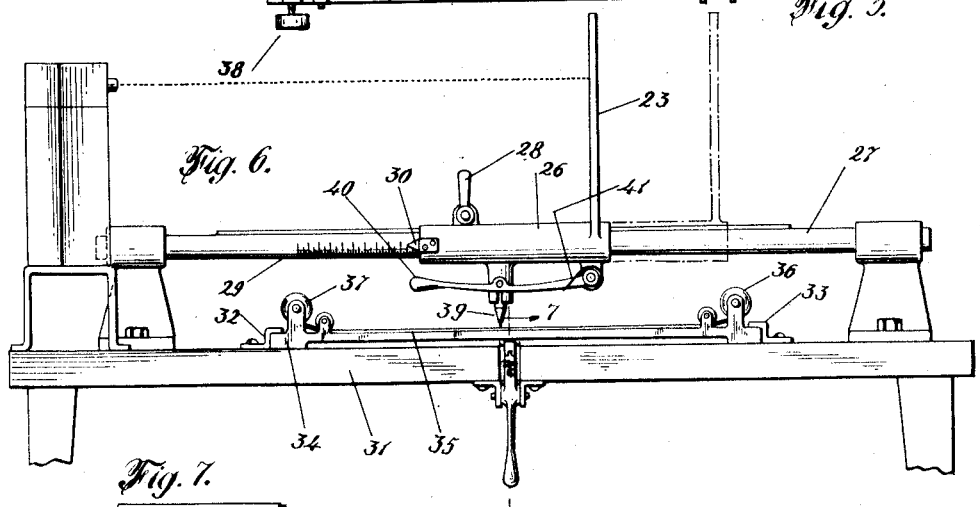
Fig. 6 is a side view in elevation of the same.

Proceeding along these lines, I have accordingly devised a simple apparatus, shown in Figs. 5 and 6, whereby the necessary data may readily be ascertained.

In the same, as stated, 14′, 15′, designate the two camera-projectors, provided with suitable means for successively producing beams of light from corresponding luminous points of the screen and photographic plate inserted in said projectors. The plane surface, 23, normal to central line C—C, is mounted on a carrier 26, adjustable along a shaft 27 in an axial direction, said shaft being in the direction C—C. Said carrier may be set at any position on said shaft by means of a locking lever 28, and its longitudinal position may be readily obtained by means of a graduation 29 on said shaft, and a pointer 30 on said carrier.

Therefore, the position of the surface for each luminous point of the screen may be obtained, the same representing the distance of the corresponding points on the surface of the model used, from the reference plane H—H; and the figures thus obtained may directly be used for the preparation of the tabulated record of depth of penetration for each point of the surface, forming the object of my co-pending application No. 695,227.

By suitable additions to the apparatus, a record in diagrammatic form may be directly obtained, obviating the necessity of reading the distance of the surface for each point, and adapted for use in preparing said tabulated record, on the profiles used in my other application No. 690,776.

Figure 7:
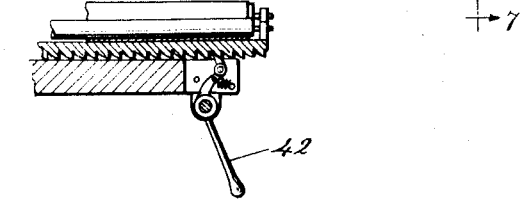
Fig. 7 is a detail cross sectional view of the same through line 7—7 of Fig. 6.

To this end, on the table 31, on which the apparatus is mounted, I provide two transversal guides between which a frame 34 is movable by some suitable step by step hand controlled mechanism, such as shown in Fig. 7, transversely to shaft 27. Said frame carries a roll of paper 35, which is wound at one end 36, and may be pulled and re-rolled at the other end 37, by means of roll operated by a button 38. Said paper may therefore gradually be fed in the direction of line C—C, while the frame carrying the same may be fed at right angle thereto.

If the paper is set at a certain position, and the frame 34 is set at one of its extreme positions, and the operation is started by projecting the first of a horizontal row of luminous points on the screen and plate, surface 23 may be set at the meeting point of the two beams of light, as explained. Carrier 26 is provided with a downwardly directed pencil or other sharp marking means 39, which may be forced against the paper by means of a lever 40, but which is normally held detached from said paper by a spring 41. At said point, therefore, the pencil or marker is operated, and an impression produced on the paper.

If now the frame is moved one step forward, by means of a lever 42, and the next luminous point in the same horizontal row is projected, a new marking will be obtained, corresponding to the new longitudinal position of the surface 23; so that when the horizontal row has been entirely projected, the paper will show a series of markings, forming a diagram such as 42, constituting the diagram of the corresponding horizontal profile on the model.

The paper may now be moved forward by means of button 38, and the diagram of the next row of luminous points may be produced in the same manner, and so on, until the entire set of diagrams is produced. If instead of horizontal diagrams or profiles, vertical ones should be desired, it is sufficient to place both the screen and the plate at an angle of ninety degrees in the projectors, proceeding then in the manner described, the vertical rows having thus been converted into horizontal rows in relation to the apparatus.

The diagrams thus obtained will obviously furnish the data from which either the tabulated record may be compiled, or the tracking profiles above mentioned.

It is thus seen that by this method an accurate record may be produced of the surface of both inanimate and living objects, from points not in contact with the same; so that models of the most delicate construction are not damaged or injured in any way.

By keeping an accurate record of the angular and linear measurements, the method may also be extended to the photographic measurement of statues and works of art which cannot be placed on a stand such as described, but which must be photographed in the place and position in which they stand.

Both the method and the apparatus described are susceptible of being modified to a certain extent, without departing from the invention herein described; and I reserve myself the right of carrying my invention into practice in any way which may enter, fairly, into the scope of the appended claims.

I claim:

1. The method of obtaining data for producing graphic records of the surface of a three-dimensional object, which consists in first projecting a screen having predetermined markings upon a model, then photographing the model with the projection of said screen thereon, and then projecting corresponding points of the screen and of the photograph upon a surface, said points being projected at a predetermined angle to each other, and in determining the distance of the corresponding points on the surface of the model from a given plane of reference, from the positions at which said projections encounter the said surface.

2. The method of obtaining data for producing graphic records of the surface of a three-dimensional object, which consists in first projecting a screen having predetermined markings upon a model, then photographing the model with the projection of said screen thereon, and then projecting, successively, a row of corresponding points, disposed within one plane of the screen and of the photograph upon a surface, the angle between the optical axes of the two projections being the same as the angle between the original optical axes, and in causing the projections of said points to coincide on said surface, by moving said surface within said plane.

3. The method of obtaining data for producing graphic records of the surface of a three-dimensional object, which consists in first projecting a screen having predetermined markings upon a model, then photographing the model with the projection of the screen thereon, and then projecting, successively, a row of corresponding points of the screen and of the photograph upon a surface, said row of projected points disposed within a plane normal to said surface, the angle between the optical axes of the two projections being the same as the angle between the original optical axes, and said surface being normal to a line bi-secting said angle, and in causing the projections of said points to coincide on said surface within said horizontal plane, by moving said surface along said bi-secting line.

4. Apparatus of the class described, comprising two camera projectors having their optical axes directed towards a common point, a surface arranged normally to a line bi-secting the angle formed by said two optical axes, and adjustable along said line, a surface movable at right angle to said line, and means for marking the position of said first mentioned surface along said line, on said movable surface.

5. Apparatus of the class described, comprising two camera-projectors having their optical axes directed towards a common point, a surface arranged normally to a line bi-secting the angle formed by said two optical axes, and adjustable along said line, a surface movable at right angle to said line, means for moving said second mentioned surface one step at a time, and means for marking the position of said first mentioned surface along said line, on said movable surface.

6. Apparatus of the class described, comprising two camera-projectors having their optical axes directed towards a common point, a surface arranged normally to a line bi-secting the angle formed by said two optical axes, and adjustable along said line, a surface adjustable in a direction parallel to said line, and movable at right angle to said line, means for moving said second mentioned surface at right angle to said line one step at a time, and means for marking the position of said first mentioned surface along said line, on said movable surface.

7. Apparatus of the class described, comprising two camera-projectors having their optical axes directed towards a common point, a surface arranged normally to a line bi-secting the angle formed by said two optical axes, and adjustable along said line, a surface movable at right angle to said line, means for moving said second mentioned surface one step at a time, means for marking the position of said first mentioned surface along said line, on said movable surface, and means for advancing said second mentioned surface in the direction of said line.

8. The method of obtaining data for producing graphic records of the surface of a three-dimensional object, which consists in first projecting a screen divided into a plurality of sections in symmetrical arrangement upon a model, then photographing the model with the projection of said screen thereon, and then serially projecting corresponding points of corresponding sections of the screen and of the photograph upon a surface, the angle between the optical axes of the two projections being the same as the angle between the original optical axes, and in causing the projections of said corresponding points to coincide on said surface, by moving said surface.

9. The method of producing graphic records of the surface of a three dimensional object, which consists in first projecting a screen divided into a plurality of sections arranged in symmetrical series of adjacent rows, upon a model, then photographing the model with the projection of said screen thereon, serially projecting corresponding points of corresponding sections of each row of the screen and of the photograph upon a surface, the angle between the optical axes of the two projections being the same as the angle between the original optical axes, and said surface being normal to a line bi-secting said angle, moving said surface along said line to positions where the projections of each two corresponding points coincide, and in causing direct markings of said positions to appear upon a diagram blank.

MARIO SCHIESARI.